United States Patent
Asakawa et al.

[11] Patent Number: 5,820,980
[45] Date of Patent: Oct. 13, 1998

[54] MAGNETIC HEAD

[75] Inventors: Toshiaki Asakawa; Shinya Ibaraki; Kazuyuki Kurita, all of Shizuoka-ken, Japan

[73] Assignee: Minebea Co., Ltd., Nagano, Japan

[21] Appl. No.: 797,280

[22] Filed: Feb. 7, 1997

[30] Foreign Application Priority Data

Mar. 8, 1996 [JP] Japan ................................ 8-080542

[51] Int. Cl.⁶ .................................................. G11B 5/66
[52] U.S. Cl. ...................... 428/332; 428/336; 428/692; 428/694 R; 428/694 T; 428/694 TS; 360/113; 324/252
[58] Field of Search ........................... 428/694 R, 694 T, 428/694 TS, 900, 332, 336, 692; 360/113; 324/252

[56] References Cited

U.S. PATENT DOCUMENTS

| | | | |
|---|---|---|---|
| 4,748,073 | 5/1988 | Sagoi | 428/213 |
| 5,132,173 | 7/1992 | Mashimoto | 428/336 |
| 5,549,978 | 8/1996 | Iwasaki | 428/692 |

FOREIGN PATENT DOCUMENTS

| | | |
|---|---|---|
| A-4-182916 | 6/1992 | Japan . |
| A-6-191172 | 7/1994 | Japan . |
| A-7-129943 | 5/1995 | Japan . |

*Primary Examiner*—Leszek Kiliman
*Attorney, Agent, or Firm*—Oliff & Berridge, PLC

[57] ABSTRACT

A thin film made of hydrogenated amorphous silicon oxide [a-SiO$_x$:H] (x=1.0 to 1.8) is formed on an upper surface of a slider and an upper surface of a head core of a magnetic head, in which the thickness of the thin film is set at 1 nm to 20 nm.

4 Claims, 4 Drawing Sheets

MAGNETIC HEAD

BACKGROUND OF THE INVENTION

1. Field of the Invention

The present invention relates to a magnetic head, and more particularly to a magnetic head in which a protective film is formed on its surface opposite to a magnetic recording medium.

2. Description of the Related Art

In recent years, recording density of a magnetic recording device such as a hard disc drive or a floppy disc drive has been increased, so that a gap between a magnetic head and a recording medium tends to become narrower and narrower (less than 50 nm). Thus, in a magnetic head of a contact start stop (CSS) system, there is a problem that characteristics of friction and wear between the magnetic head and the recording medium at its start and stop, so-called CSS characteristics are degraded. Particularly, in a magnetic head in which a slider is made of a nonmagnetic ceramics meterial ($CaTiO_3$, $Al_2O_3$—TiC, MnO—NiO, $ZrO_2$, etc.), the degradation of the CSS characteristics has become a serious problem.

Conventionally, some proposals have been presented regarding an improvement of the CSS characteristics. For example, there have been already attempted a chemical etching method (Japanese patent application No. Hei 6-191172), an ion implantation method (Japanese patent laid-open publication No. Hei 7-129943), a diamond like carbon (DLC) deposition method (DLC film applied as a protective film to a surface opposite to a recording medium) (Japanese patent laid-open publication No. Hei 4-182916) and the like.

However, according to the above chemical etching method, since this method is a measure for changing a roughness of a surface opposite to a recording medium, it has an effect to decrease the stiction to the surface of the recording medium, at the same time, this method has little effect to improve the CSS characteristics (friction and wear characteristics). Also, the above ion implantation method has a problem that an improvement of the CSS characteristics is not so effective for requiring an expensive equipment.

On the other hand, although the above DLC deposition method has a possibility that the friction and wear charcteristics are to be improved, since a protective film made of different quality is formed on a surface of a magnetic head and the protective film is mainly made of carbon, there is a possibility that the carbon may react with oxygen in the air due to a heat generated by friction between the magnetic head and a recording medium to decrease the CSS characteristics. Further, since the DLC is also used as a protective film on a surface of the recording medium, there is increased a possibility of stiction and wear of the respective surfaces of the magnetic head and the recording medium due to the reaction between the DLCs. Moreover, since the DLC film has an inferior adhesion to a head base material, an under film of Si etc. must be formed. As a result, the total film thickness becomes large, so that there is a fear that electromagnetic conversion characteristics are reduced by spacing loss.

SUMMARY OF THE INVENTION

In view of the above circumstances, the present invention is made and whose object is to overcome the problem regarding a friction and a wear generated between a magnetic head and a magnetic recording medium, which is achieved by forming a protective film on a surface of the magnetic head opposite to the magnetic recording medium, wherein the protective film having good wear resistance, chemical stability, and high adhesion to a head base material.

In order to solve the above problem, the present invention is characterized in that a hydrogenated amorphous silicon oxide [a-$SiO_x$:H] film is formed on a surface of a magnetic head opposite to a magnetic recording medium.

The film hydrogenated amorphous silicon oxide [a-$SiO_x$:H] film causes the friction coefficient of the magnetic head to be decreased when it is come into contact with the magnetic recording medium, therefore, the wear resistance of the magnetic head is to be increased. Further, the hydrogenated amorphous silicon oxide itself is chemically stable and does not react with oxygen in the air and with DLC as a protective film of the recording medium, and moreover, has sufficiently high adhesion to a head base material.

In the present invention, it is preferable to set the value of x in the hydrogenated amorphous silicon oxide [a-$SiO_x$:H] at 1.0–1.8. This is because in case the value of x is less than 1.0, hydrogen to be filled to the oxygen vacancy of $SiO_2$ becomes excessive, so that a uniform thin film is hard to be obtained, on the other hand, in case the value of x is more than 1.8, hydrogen to be filled to the oxygen vacancy of $SiO_2$ is not enough, so that the improvement of the wear resistance is not effective.

Further, in the present invention, when a thickness of the hydrogenated amorphous silicon oxide [a-$SiO_x$:H] film is extremely small, the effect to be improved of the wear resistance is small, on the other hand, when its thickness is excessively large, a spacing loss becomes large to degrade the electromagnetic conversion characteristics. Thus, its thickness is desirably set at 1 nm–20 nm.

DETAILED DESCRIPTION OF THE INVENTION

Figure 1:
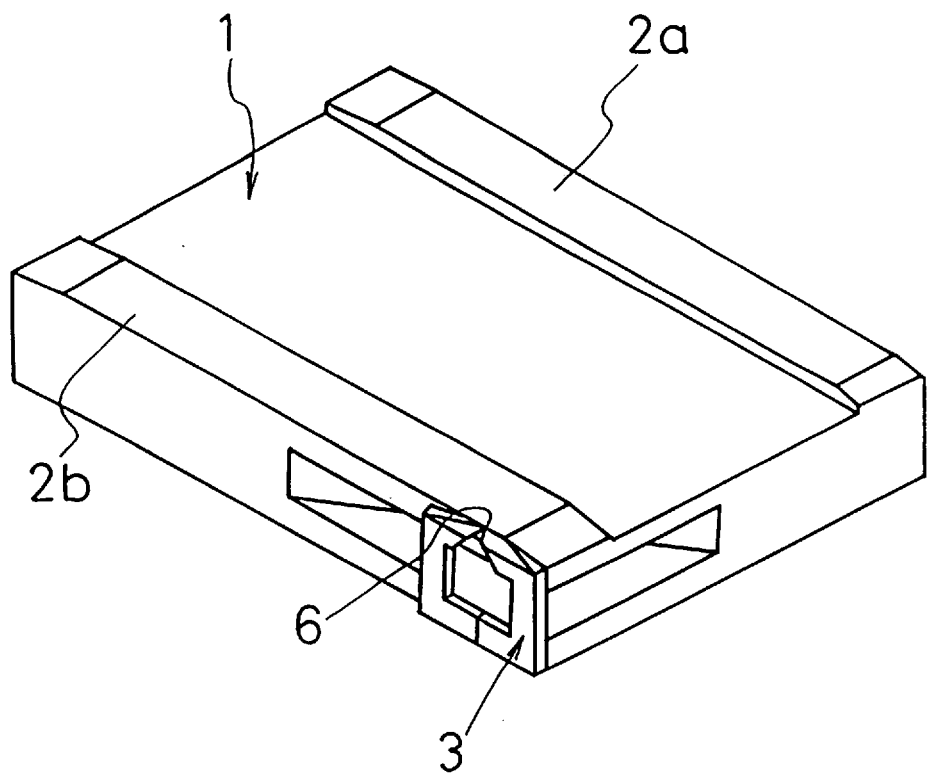
FIG. 1 is a perspective view showing the entire structure of a floating type of magnetic head which is one of the applications of the present invention.
Figure 2:
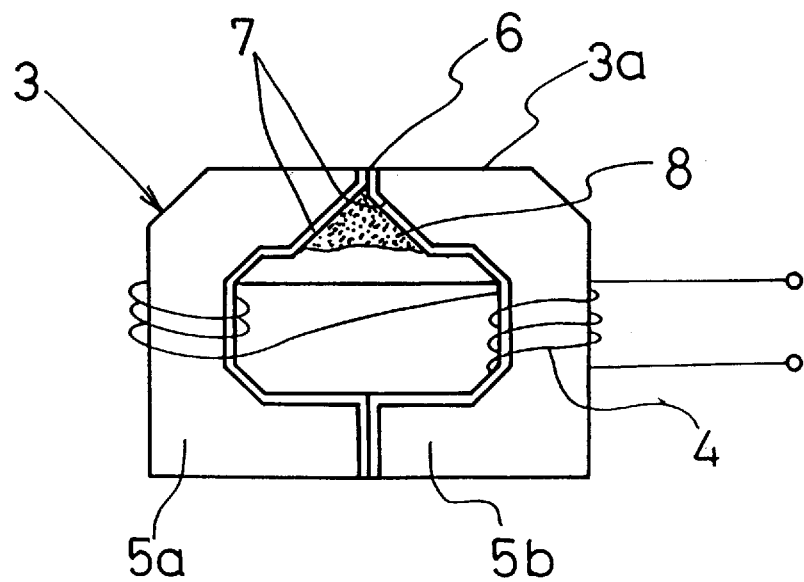
FIG. 2 is a front view showing the structure of a head core of the magnetic head shown in FIG. 1.

In a preferred embodiment, the present invention is applied to a floating type of magnetic head for a hard disc drive, wherein a hydrogenated amorphous silicon oxide [a-$SiO_x$:H] film is formed on a surface of the magnetic head opposite to a magnetic recording medium. The floating type of magnetic head includes, for example, as shown in FIGS. 1 and 2, a rectangular plate-like slider 1 made of nonmagnetic ceramics, a pair of rails 2a and 2b for floating which are formed at both sides of a surface of the slider 1 opposite to a magnetic recording medium, a head core 3 connected to a corner portion, at which a groove is provided, of a side surface of the rail 2b, and a coil 4 wound around the head core 3. The head core 3 has such a structure that a pair of C-shaped members 5a and 5b made of ferrite are abutted with each other so as to form an annular integration. One of the abutted portions of the C-shaped members 5a and 5b is provided with a gap 6 of a small length (0.3 μm). The inner surfaces of the C-shaped members 5a and 5b are coated with metal films 7 of iron nitride, for example. A glass 8 is filled in the space between the C-shaped members 5a and 5b at the side of the gap 6.

In the above megnetic head, when the magnetic recording medium (not shown) is at a standstill, the rails 2a and 2b on the slider 1 and an upper surface 3a of the head core 3 (hereinafter referred to as "surface opposite to the recording medium") are brought into contact with the recording medium. When the recording medium is rotated at a high speed, it is floated slightly by the effect of air bearing. At the same time of a stop of the rotation of the recording medium, the surface opposite to the recording medium is again brought into contact with the recording medium. That is, this magnetic head can be operated in a contact start stop (CSS) system. The contact surface of the magnetic head is worn off by the friction at a contact against the recording medium at start and stop thereof.

According to the embodiment of the present invention, the hydrogenated amorphous silicon oxide [a-SiO$_x$:H] film is formed on the surface opposite to the recording medium by a sputtering method. When the sputtering is performed, a SiO$_2$ target and a magnetic head are disposed in a vacuum chamber, a mixture gas of which Ar gas and hydrogen gas are mixed at a predetermined ratio is used as a sputtering gas, and a radio frequency power (13.56 MHz) is applied between two electrodes to generate RF plasma so-called radio frequency (RF) sputtering, so that the hydrogenated amorphous silicon oxide [a-SiO$_x$:H] film is deposited on the surface opposite to the recording medium to form a thin film.

Any method can be employed to form the hydrogenated amorphous silicon oxide [a-SiO$_x$:H] film on the surface opposite to the recording medium. Instead of the above radio frequency sputtering method, an ion beam deposition method, a chemical vapor deposition method (CVD), a liquid phase epitaxy method (LPE) and the like can be adopted. Further, the present invention may be applied not only to the hard disc drive but also to a floppy disc drive or a video tape drive.

EXAMPLE 1

Figure 3:
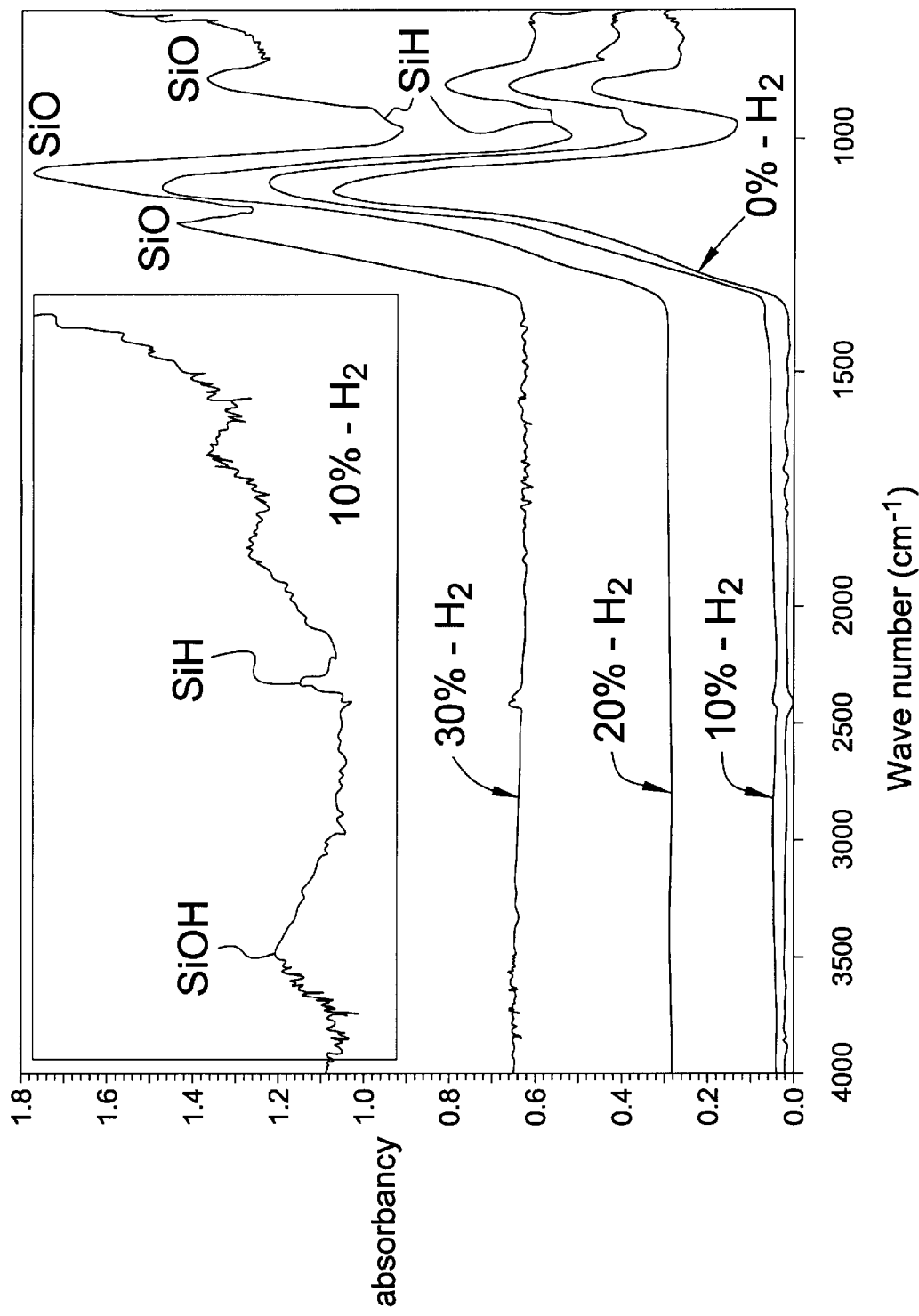
FIG. 3 is a graph showing infrared absorption spectra of a hydrogenated amorphous silicon oxide [a-$SiO_x$:H] film formed on a surface opposite to a mangetic recording medium.

The amount of hydrogen gas in a sputtering gas (mixture gas) introduced into a vacuum chamber (hereinafter referred to as "amount of introduced hydrogen gas") was made to be changed variously between 0% and 30% in volume rate, and the radio frequency sputtering was performed using a SiO$_2$ target in the same way as the above embodiment, so that hydrogenated amorphous silicon oxide [a-SiO$_x$:H] film were formed on a ceramics substrate. As a result of the above, the infrared absorption spectra of the respective thin films were measured. FIG. 3 shows the measurement results thereof. In the respective films, two or three absorption peaks peculiar to SiO are recognized (in the vicinity of wavenumber 810 cm$^{-1}$, 1050 cm$^{-1}$, and 1150 cm$^{-1}$). On the other hand, in the thin films formed under the condition of the amounts of introduced hydrogen gas of 10%, 20% and 30%, other than the above-mentioned absorption peaks peculiar to SiO, absorption peaks peculiar to SiH are recognized in the vicinity of wavenumber 910 cm$^{-1}$ and 2270 cm$^{-1}$. Further, absorption peaks peculiar to SiOH are recognized in the vicinity of wavenumber 3613 cm$^{-1}$. It is therefore found that H atoms is bonded with Si atoms.

On the other hand, in the hydrogenated amorphous silicon oxide [a-SiO$_x$:H] film formed in the above described manner, due to a study of the relation between the amount of the oxygen contained in the film and the amount of introduced hydrogen gas, it is found that as the amount of introduced hydrogen gas increases, the amount of the oxygen contained in SiO$_2$ decreases accordingly, that is, the oxygen vacancy increases. It is conceivable that hydrogen in [a-SiO$_x$:H] is chemically bonded with a dangling bond (uncombined bond) generated by the oxygen vacancy to thereby decrease the structural defect and surface energy, so that it contributes to improvement of frictional characteristics.

EXAMPLE 2

The amount of hydrogen gas introduced into a vacuum chamber was set at 10%, and the radio frequency sputtering was performed, using a SiO$_2$ target, so that a hydrogenated amorphous silicon oxide [a-SiO$_x$:H] film was formed on the upper surface of the slider 1 including the rails 2a and 2b and on the upper surface 3a of the head core 3 (surface opposite to the recording medium) of the magnetic head shown in FIG. 1. The film obtained in the above manner was employed to a CSS characteristics test. The CSS characteristics test was performed under the following conditions, i.e., in a clean constant temperature vessel (class 100) kept at 25° C. and 50% RH, a rotation rising time is 5 sec, a maximum rotation number is 4100 rpm, a time of keeping the maximum rotation is 2 sec, a rotation lowering time is 6 sec, and a gap between the magnetic head and the recording medium is 35 nm. In the above test, the change of friction coefficient for CSS cycles was measured. For comparison, a similar test was executed to a magnetic head without formation of a hydrogenated amorphous silicon oxide [a-SiO$_x$:H] film.

Figure 4:
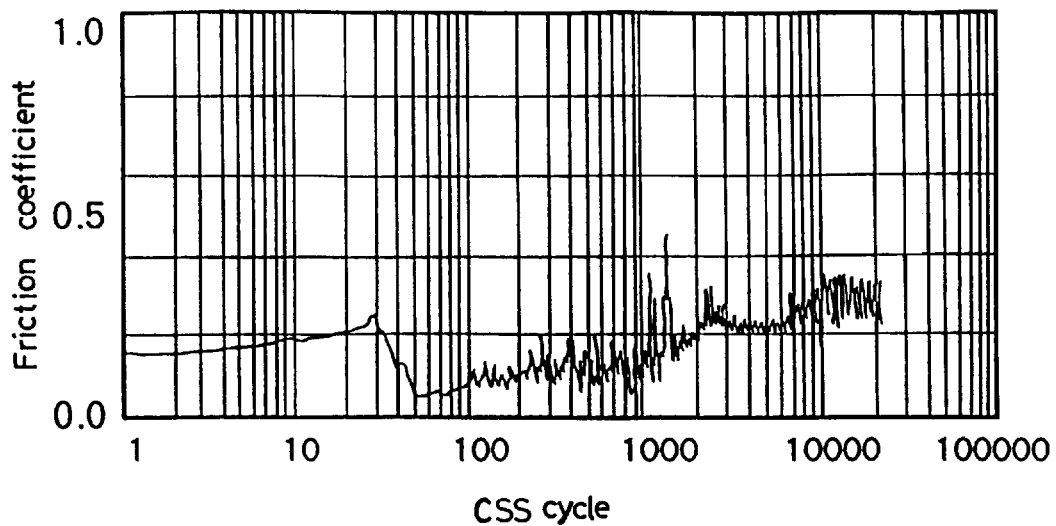
FIG. 4 is a graph showing the test results of CSS characteristics of a magnetic head without a protective film.
Figure 5:
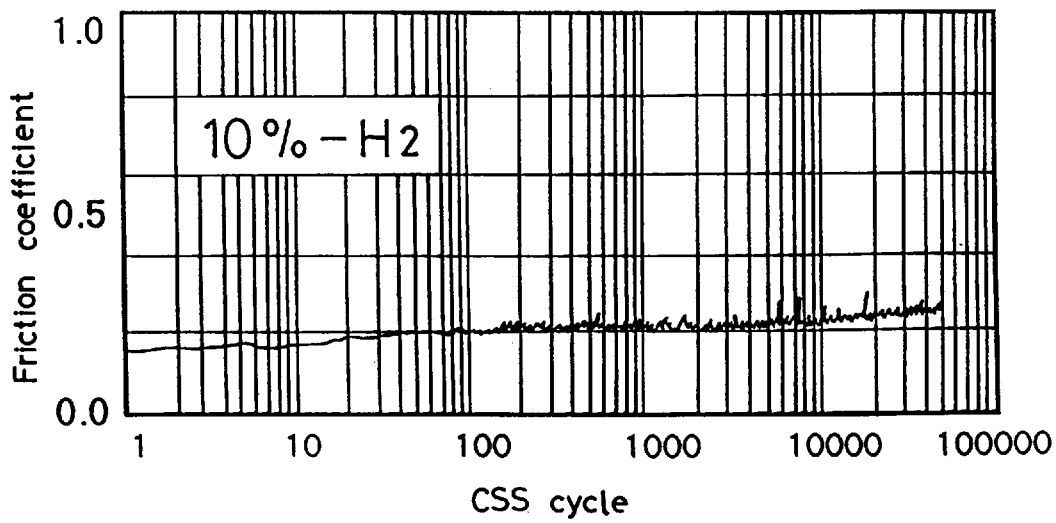
FIG. 5 is a graph showing the test results of CSS characteristics of a magnetic head of the present invention.

FIGS. 4 and 5 show the results of the CSS characteristics test. According to these drawings, in the magnetic head of the present invention in which the hydrogenated amorphous silicon oxide [a-SiO$_x$:H] film is formed on the surface opposite to the recording medium, as shown in FIG. 5, up to 50,000 CSS cycles, the friction coefficient thereof changes at a low value level with small variation. According to the above, the magnetic head of the present invention is evidently superior in the long term stability. On the other hand, in the magnetic head without a protective film, as shown in FIG. 4, the friction coefficient becomes unstable at 30 CSS cycles, and the variation in the friction coefficient becomes extremely large at several thousands cycles to cause head crush to the recording medium.

When the CSS characteristics test was executed under the conditions of constant temperature of 25° C. and high humidity of 80% RH, the above magnetic head without a protective film adhered to the recording medium at about 20 CSS cycles, while the magnetic head of the present invention did not adhere to the recording medium up to an objective value of 50,000 CSS cycles. Further, it was made clear that the friction coefficient at 50,000 CSS cycles is within the range of about 1.4 times as large as that obtained in the test under the condition of 25° C. and 50% RH.

EXAMPLE 3

The amount of hydrogen gas introduced into a vacuum chamber was made to be changed variously within the range of 0% to 25%, and the radio frequency sputtering was performed, using a SiO$_2$ target like example 2, to form magnetic head in which hydrogenated amorphous silicon oxide [a-SiO$_x$:H] film were formed on the surfaces opposite to a recording medium. The friction coefficient at 50,000 CSS cycles was measured for the respective magnetic heads obtained thereby with the same method hereinbefore as example 2, and the effect of the amount of introduced hydrogen gas to the CSS characteristics was studied.

Figure 6:
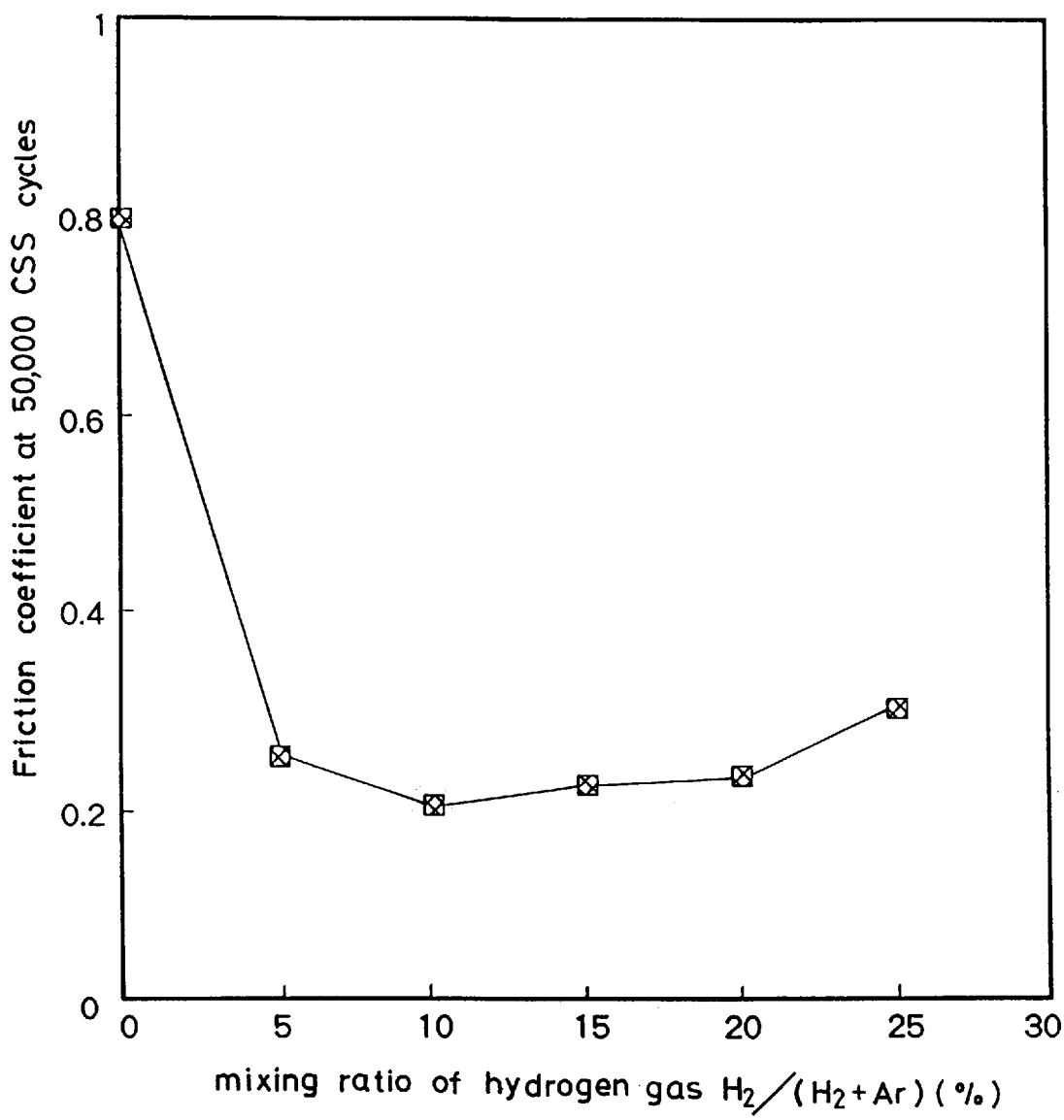
FIG. 6 is a graph showing the effect of the amount of introduced hydrogen gas to the CSS characteristics when a hydrogenated amorphous silicon oxide [a-$SiO_x$:H] film is formed by a sputtering method.

FIG. 6 shows the results of the study aforementioned. According to the results, it is found that the friction coefficient is extremely large for the magnetic head (comparative example) in which a [a-SiO$_x$] film was formed on the surface opposite to the recording medium without introducing hydrogen gas (0%). On the other hand, the friction coefficient of the magnetic head in which the [a-SiO$_x$:H] film was formed on the surface opposite to the recording medium is about one fourth of that of the comparative example, and the magnetic head has superior CSS characteristics.

For reference, when the hydrogenated amorphous silicon oxide [a-SiO$_x$:H] film was formed under the condition that the amount of introduced hydrogen gas was 30%, it is found that the film structure has many voids of a several tens of μm order to form porous, so that it is not suitable as a protective film.

EXAMPLE 4

In a manufacturing process of a magnetic head, an alkaline solution is used as a cleanser, so that a protective film of the magnetic head is required to be superior in alkaline-solution resistant properties. In this example 4, the magnetic heads of example 3, in which the hydrogenated amorphous silicon oxide [a-SiO$_x$:H] film were formed under the condition that the amount of introduced hydrogen gas was 5%–20%, were immersed in an alkaline solution and an etching test was executed. As a result, etching did not occur in any thin films, so that it is confirmed that the films are superior in the alkaline-solution resistant properties.

EXAMPLE 5

Since a [a-SiO$_x$:H] film is formed on a surface including the head core 3 (FIGS. 1 and 2) opposite to a recording medium, there might be happened that electromagnetic conversion characteristics are degraded by spacing loss due to a film thickness on the head core 3. In this example, the amount of hydrogen gas introduced into a vacuum chamber was set at 10%, and the radio frequency sputtering was performed, using a SiO$_2$ target and changing a processing time variously, to form magnetic head in which hydrogenated amorphous silicon oxide [a-SiO$_x$:H] film with its thickness of 1 nm to 20 nm were formed on surface opposite to a recording medium. The electromagnetic conversion characteristics of the respective magnetic heads obtained thereby was measured by a measuring device (R/W measuring devide). Incidentally, the measurement of the electromagnetic conversion characteristics was performed based on a method of measurement of outputs (HF TAA) at the side of a recording medium inner circumference. Table 1 shows the results.

TABLE 1

| Film thickness (nm) | Output HF TAA (μV) | | |
|---|---|---|---|
| | Before deposition | After deposition | Rate of change |
| 1 | 268 | 267 | 1.00 |
| 10 | 266 | 258 | 0.97 |
| 15 | 272 | 242 | 0.89 |
| 20 | 272 | 220 | 0.81 |

From the results shown in Table 1, when the thickness of the thin film (film thickness) is 1 nm, the outputs before and after film deposition are almost equal to each other, and a decrease of electromagnetic conversion characteristics is not recognized. When the film is 10 nm or more, it is found that as the film thickness increases, the output decreases accordingly. However, even when the film thickness is 20 nm, the rate of change of electromagnetic conversion characteristics is about 81%, which shows that there is little problem in performance.

EXAMPLE 6

In general, as to the metal film 7 of the head core 3 of the magnetic head, a soft magnetic film with a high iron content is employed thereto, which is degraded through corrosion due to chlorine or sulphur in the air, so that a magnetic head crush to a recording medium is apt to occur. However, the magnetic head of the invention in which the hydrogenated amorphous silicon oxide [a-SiO$_x$:H] film is formed on the surface opposite to the recording medium, even if the thickness of the thin film is 1 nm, does not receive a corrosion due to Cl$^-$ ions, and the magnetic head is evidently superior in the long term stability.

According to the present invention, the hydrogenated amorphous silicon oxide [a-SiO$_x$:H] film formed on a surface of a magnetic head opposite to a recording medium, not only extremely improves the friction and wear characteristics to the magnetic recording medium, but also suppresses the stiction of the magnetic head to the magnetic recording medium to thereby contribute to the increase of recording density of a magnetic recording device. Further, since the amorphous silicon oxide hydride [a-SiO$_x$:H] is chemically stable, superior incorrosion resistance, and functions to suppress the corrosion of a head core, the long term stability of the magnetic head is improved. Moreover, the hydrogenated amorphous silicon oxide [a-SiO$_x$:H] film plays sufficient effects even if a film thickness is small, and has strong adhesion to a head base material to eliminate the necessity of forming an upper layer, so that there is in no danger of decreasing electromagnetic conversion characteristics due to spacing loss. Consequently, the magnetic head of the invention is superior in durability and reliability.

What is claimed is:

1. A magnetic head, which can be used for reading information from or writing information on a magnetic recording medium, the magnetic head comprising:

a head core comprising a magnetic substance;

a slider comprising a non-magnetic substance, the slider having a pair of rails comprising a surface facing the magnetic recording medium; and a hydrogenated amorphous silicon oxide (a-SiO$_x$:H) film on the surface.

2. The magnetic head according to claim 1, wherein a value of x in the hydrogenated amorphous silicon oxide (a-SiO$_x$:H) film is 1.0 to 1.8.

3. The magnetic head according to claim 1, wherein a thickness of the film is 1 nm to 20 nm.

4. The magnetic head according to claim 1, wherein the non-magnetic substance is a ceramic.

* * * * *